United States Patent [19]

Davis

[11] 4,033,744
[45] July 5, 1977

[54] PLUNGER ASSEMBLY FOR A GLASS FORMING MACHINE

[75] Inventor: Robert Earl Davis, Muncie, Ind.

[73] Assignee: Ball Corporation, Muncie, Ind.

[22] Filed: Sept. 18, 1975

[21] Appl. No.: 614,735

[52] U.S. Cl. .................................. 65/362; 65/319; 65/356
[51] Int. Cl.² ................... C03B 11/12; C03B 11/10
[58] Field of Search .................... 65/319, 356, 362

[56] References Cited

UNITED STATES PATENTS

| 3,273,991 | 9/1966 | Denman | 65/307 |
| 3,376,123 | 4/1968 | Leeuw | 65/319 X |
| 3,573,025 | 3/1971 | Hamilton | 65/319 X |

*Primary Examiner*—Arthur D. Kellogg
*Attorney, Agent, or Firm*—J. David Haynes

[57] ABSTRACT

Apparatus wherein the base of a plunger used to form a parison in a glass forming machine is provided with a plurality of ears which interlock with a plurality of flanges disposed within a recessed area within a plunger head to detachably engage the plunger to the plunger head by simply rotating the plunger relative to the plunger head.

9 Claims, 6 Drawing Figures

PLUNGER ASSEMBLY FOR A GLASS FORMING MACHINE

BACKGROUND OF THE INVENTION

1. Field of the Invention

This invention relates to glass container manufacturing and more particularly to an improved plunger assembly useful in initial formation of the parison in the blank mold.

2. Description of the Prior Art

The most commonly employed machine for glass container manufacture is the individual section (I.S.) machine wherein the various individual operations involved in glass container manufacture are sequentially performed in successive individual sections. During the initial stage of the formation of the glass container a gob of molten glass is delivered to a blank station. The gob is then settled into the blank mold and a plunger is brought into active contact with the gob to cause it to form a parison having a shape peculiar to the type of glass container being manufactured.

The plunger is secured to a plunger head with a pair of split rings. In operation the plunger, the plunger head and the shaft upon which the plunger head is mounted reciprocate to bring the plunger in contact with the molten glass held in the blank mold. The plunger assembly is disposed in a cylinder to maintain axial control over the plunger, to accurately insert and guide the plunger into the blank mold, and to secure the split rings into a position which secures the plunger and the plunger head one to the other.

The plunger has internal passageways which transmit cooling air thereinto and therefrom. The pressure resulting from the air as well as other problems such as misalignment or misadjustment of the shaft which supports and directs the plunger causes the split rings to contact and strip away or abrade minute particles of metal from the encasing cylinder. Certain amounts of the metal particles inherently find their way into the glass parison to thus cause the glass to be contaminated.

The presence of these small particles of metal in the glassware greatly reduces the strength of the container and causes certain foodstuffs stored in the containers to undergo chemical reaction to thus contaminate the foodstuff. Accordingly, the pack rate of containers is adversely affected and the reject rate from users of the containers increases as the industry's cognizance of the imperfection increases.

Additionally, in order to cause the I.S. machine to produce a different type of container or to change the plunger in case of damage, it is necessary to stop the machine, remove the finish ring, rotate the plunger assembly to its extended position, remove the split rings, replace the plunger and repeat the procedure in reverse. Consequently, the replacement of a plunger causes a certain period of "down" time in which no ware may be produced and a resulting reduction in the efficiency of the machine.

SUMMARY OF THE INVENTION

It is an object of this invention to provide a plunger which may be quickly and disengaged from the plunger head.

It is another object of this invention to provide a plunger assembly which results in a reduction of undesired metal particles previously present in finished glassware.

In the efficient attainment of these and other objects there is presented in the present invention a novel plunger which eliminates the split ring as a means of securing the plunger to the plunger head. In the present invention, the base of the plunger is provided with a plurality of ear members which interconnect with and secure the plunger to flanges on the plunger head. This arrangement permits the plunger to be readily attached to or detached from the plunger head without the time-consuming procedure presently folowed. The plunger may be simply inserted into a recessed area in the plunger head and rotated to cause the ears and the flanges to engage in a mating relationship and thus secure the plunger to the plunger head. Spring-biased retaining means are disposed in the recessed area of the plunger head to cause the plunger to reside in a controlled relationship. The plunger and the plunger head are thus secured one to the other without the need of split rings.

The foregoing and other objects and features of the invention will be evident from the following detailed description of preferred embodiments thereof and the drawings wherein like numerals are used to identify like parts throughout.

DESCRIPTION OF THE PREFERRED EMBODIMENT

Figure 1:
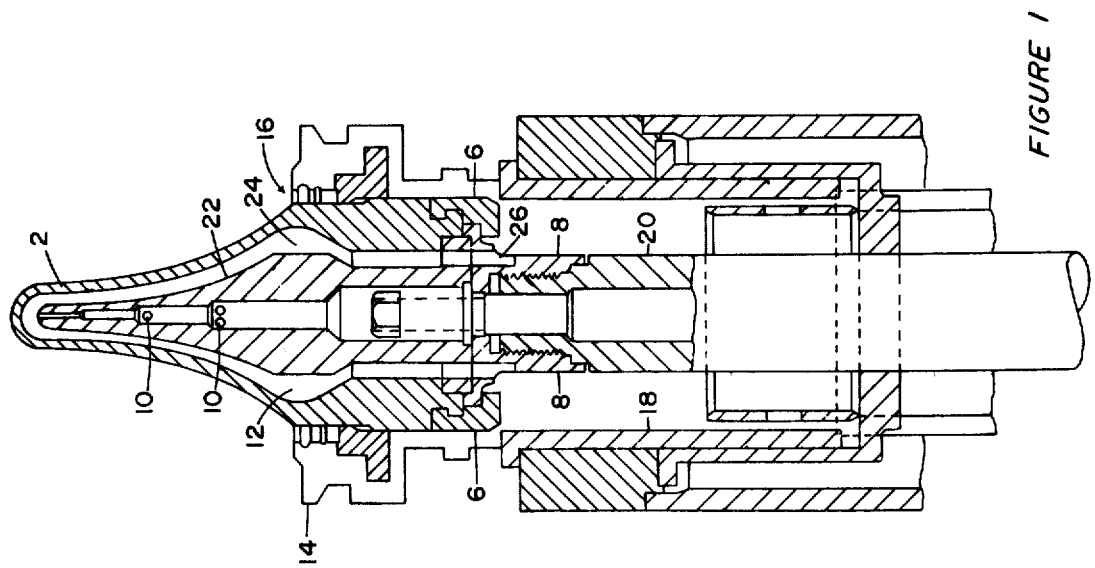
FIG. 1 is a diagrammatic sectional side view of a plunger and a plunger head as presently used in glass container manufacturing.

Referring to FIG. 1, a plunger 2 is shown attached to plunger head 8 by split rings 6. A blank mold (not shown) is positioned above plunger 2 and in contact with finish ring 14. A gob of molten glass is introduced into the blank mold and the plunger is caused to enter the mold and deform the gob contained therein. The molten glass assumes the general shape of the plunger and also is forced into the finish ring at 16 to initially form the finish or "threaded" portion of the container.

In operation the split rings 6 secure the plunger 2 to plunger head 8. The only force used to secure the split rings in their relationship to the plunger and the plunger head is the force exerted thereon by the finish ring 14 and the receiver wall 18. Cooling air is directed through the interior of shaft 20, the holes 10 in cooler 22, the passageway 24, and to the atmosphere through holes 26 which are located in plunger head 8. Metal particles eroding from receiver wall 18 and split rings 6 ofttimes migrate upwardly to emerge and become fixed into the parison being formed about the end of the plunger. This has caused significant problems as previously noted in the disclosure.

Figure 2:
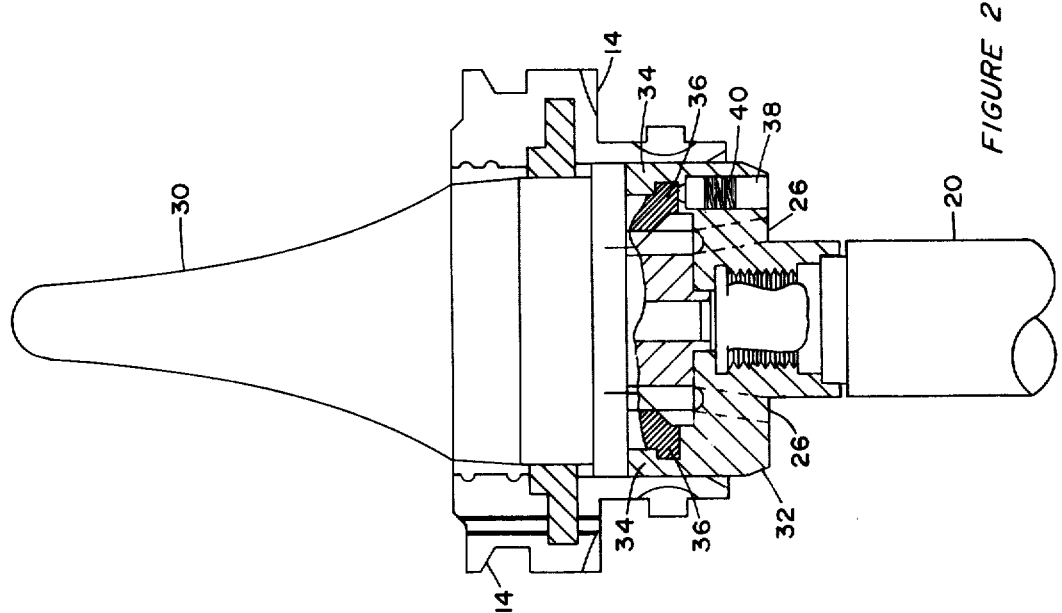
FIG. 2 is a diagrammatic view, partly in a cross section, of an exemplary embodiment of the present invention.

FIG. 2 shows the present invention. By comparison with FIG. 1, the present invention resides in the novel embodiment which enables the plunger 30 to be secured to plunger head 32. Finish ring 14 and shaft 20 cooperate with the plunger and plunger head of the present invention in the same fashion as previously discussed. The plunger 30 is shown in a mating relationship with plunger head 32. Ears 36 co-act with flanges 34 to secure plunger 30 to plunger head 32.

Figure 3:
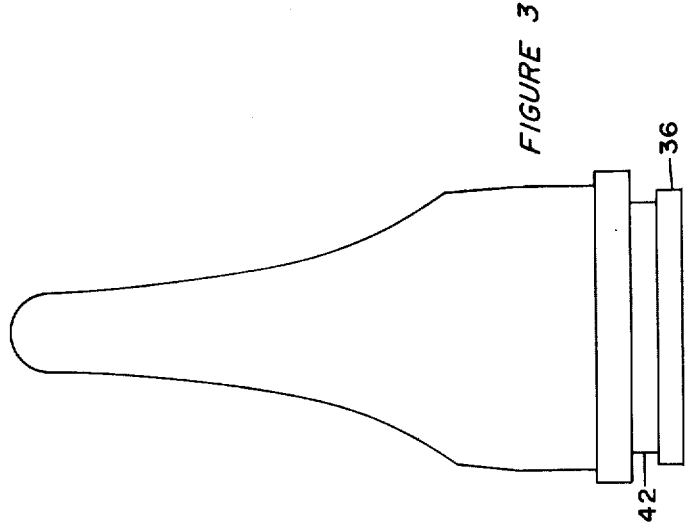
FIG. 3 is a side view of the plunger.
Figure 4:
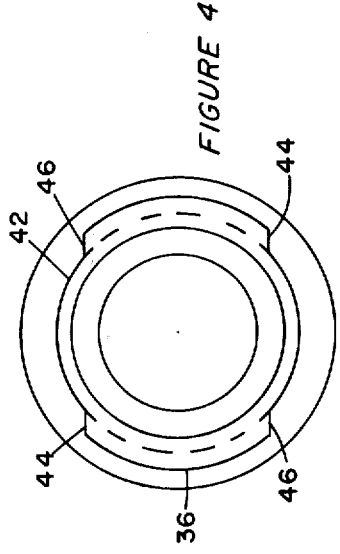
FIG. 4 is a bottom view of the plunger.

FIGS. 3 and 4 disclose the plunger according to the present invention. Ears 36 are disposed in recessed area 42 and extend annularly about the periphery of the plunger. The ears 36 do not extend about the entire periphery of the plunger. In FIG. 4 it can be seen that the ears extend more than 90 degrees and less than 180°. While the preferred embodiment disclosed only two ears and two flanges it would work equally as well with other numbers of ears and flanges. Ears 36 are beveled at their leading edges 44 and their lagging edges 46 in order to cause the ears to more easily override and depress retaining or alignment means 38 (FIG. 2). The ears are machined or cast as a part of the plunger and protrude outwardly from recessed area 42.

Figure 5:
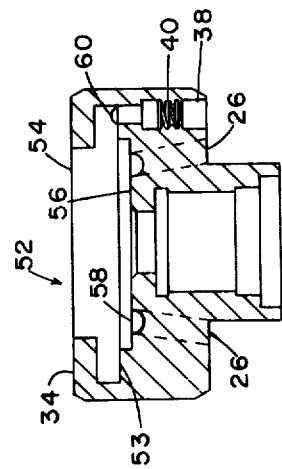
FIG. 5 is a top view of the plunger head.
Figure 6:
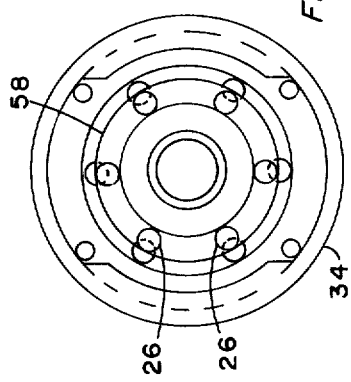
FIG. 6 is a side view sectional view of the plunger head.

FIGS. 5 and 6 disclose the plunger head. Flanges 50 extend over depressed area 51 and extend partly about the annular wall of rim 54. The distance between the base or bottom 53 of the plunger head and the flange is sufficient to receive the ears of the plunger. An annular depression 58 in the base of the plunger head comminicates with a plurality of holes 26 in order to permit air passing from cooler 22 (FIG. 1) to escape through its conventionally designed base and through the base of the plunger head. Boss 56 may take the form of various configurations depending upon the exact type of cooler being mated therewith.

Alignment and retaining means 38 is biased by spring 40. When the plunger is being mated with the plunger head, the plunger is first positioned such that ears 36 and flanges 34 are entirely out of phase. At this location, the alignment and retaining means is in contact with or closely positioned to the leading and lagging edges 44 and 46 of the plunger. As the plunger is rotated about its longitudinal axis, the beveled edges cause the top 60 of the alignment and retaining means to be depressed to thereby permit the ears of plunger 30 to pass over the top portion 60 and under flanges 34. The alignment and retaining members 38 are positioned radially about the base of the plunger head in such fashion that their tops 60 will not be depressed when the flanges and ears are in alignment, i.e., they are properly mated to hold the plunger in its operating position.

The plunger 30 may be easily engaged with or disengaged from plunger head 32. An operator may make the change by simply rotating the plunger, selecting another plunger and engaging it to the plunger head. There is no need to remove the finish ring 14 to make a change in the plunger. It is not imperative that the shaft 20 be positioned to cause the plunger to be in its most extended position to permit removal of the plunger. Most importantly, the present invention greatly reduces the presence of the foreign metallic particles which contaminate the glassware.

It is thus apparent that a plunger assembly has herein been disclosed which permits the plunger to easily and quickly be engaged to or disengaged from the plunger head. This new engagement technique greatly decreases the time required to change plungers and eliminates to a significnat degree the presence of foreign metallic particles whose presence was caused by prior-art designs. While the invention has been herein shown and described in what is presently conceived to be the most practical and preferred embodiment, it will be obvious to one of skill in the art that many equivalent structures, methods, variations and modifications are considered to be within the scope of this invention as defined by the appended claims.

I claim:

1. A plunger assembly for use in a glass forming machine, said plunger assembly comprising:
   an unitary plunger and
   an unitary plunger head,
   said plunger head having a central bore containing an engaging means within an annular wall, said engaging means comprising a base of a shape to engage a surface of said plunger and spring biased alignment means extending from said base to disengageably secure said plunger head in a mating relationship, and a plurality of flanges spaced about the periphery of said annular wall, said flanges being disposed on said wall and protruding inwardly,
   said plunger being a cylindrical member having a reduced annular section about the periphery thereof at a first end of said member and of a diameter to fit within said annular wall and further comprising a plurality of ears radiating outwardly from said reduced annular section and having a spacing sufficient to pass between said flanges and having a width to lie between said alignment means said ears and said flanges being arranged so as to permit said plunger and said plunger head to fixedly engage in said mating relationship.

2. A plunger for use in a glass forming machine as set forth in claim 1 wherein at least one surface of said ear is co-extensive with the bottom surface of said plunger.

3. A plunger for use in a glass forming machine as set forth in claim 1 wherein each said ear has a leading edge and a lagging edge, said leading edges being beveled upwardly from the bottom surface.

4. In a glass forming machine utilizing a plunger having a reduced annular section about the periphery thereof and a plurality of ears of a preselected spacing and width radiating outwardly about the reduced annular section, an unitary plunger head for securing the plunger thereinto, said plunger head comprising a central cavity having an annular wall thereabout, said cavity having:
   a base of a shape to engage a surface of the plunger;
   a plurality of flanges spaced about the inward surface of said annular wall and having a spacing sufficient to receive therebetween and thereunder the ears of a plunger; and
   spring-biased alignment means disposed in said base and positioned to reside between the ears of a plunger secured thereinto.

5. In a glass forming machine utilizing a plunger head having a central bore with an annular wall thereabout with a plurality of flanges of preselected spacing and width radiating inwardly about the annular wall and spring-biased alignment means disposed in the base thereof, a plunger for insertion into said plunger head for mating engagement therewith, said plunger comprising:
   a cylindrical member having a reduced annular section about the periphery of a first end of said member and of such shape and size to pass into the central bore of a plunger head;
   a plurality of ears extending outwardly from said reduced annular section and having a spacing sufficient to pass between and beneath the flanges of the plunger head and a width sufficient to lie between the alignment means of a plunger head when the plunger and the plunger head are disengageably engaged in a mating relationship.

6. A plunger as set forth in claim 5 wherein at least one surface of said ear is co-extensive with the bottom surface of said plunger.

7. A plunger as set forth in claim 5 wherein each ear has a leading edge beveled upwardly from the bottom surface of said plunger.

8. A plunger head as set forth in claim 4 to further comprise a boss disposed on said base, a boss having a shape to interface with a surface of a plunger.

9. A plunger head as set forth in claim 4 wherein said spring-biased alignment means are depressible into said bore to thus enable the ears of a plunger to pass thereover and beneath said flanges whereby a plunger may be rotatably secured into said plunger head.

* * * * *